Dec. 15, 1931. W. T. WEBSTER ET AL 1,836,563
METHOD FOR FOAM ABATEMENT AND CHEMICAL RECOVERY
Filed March 25, 1930 2 Sheets-Sheet 2
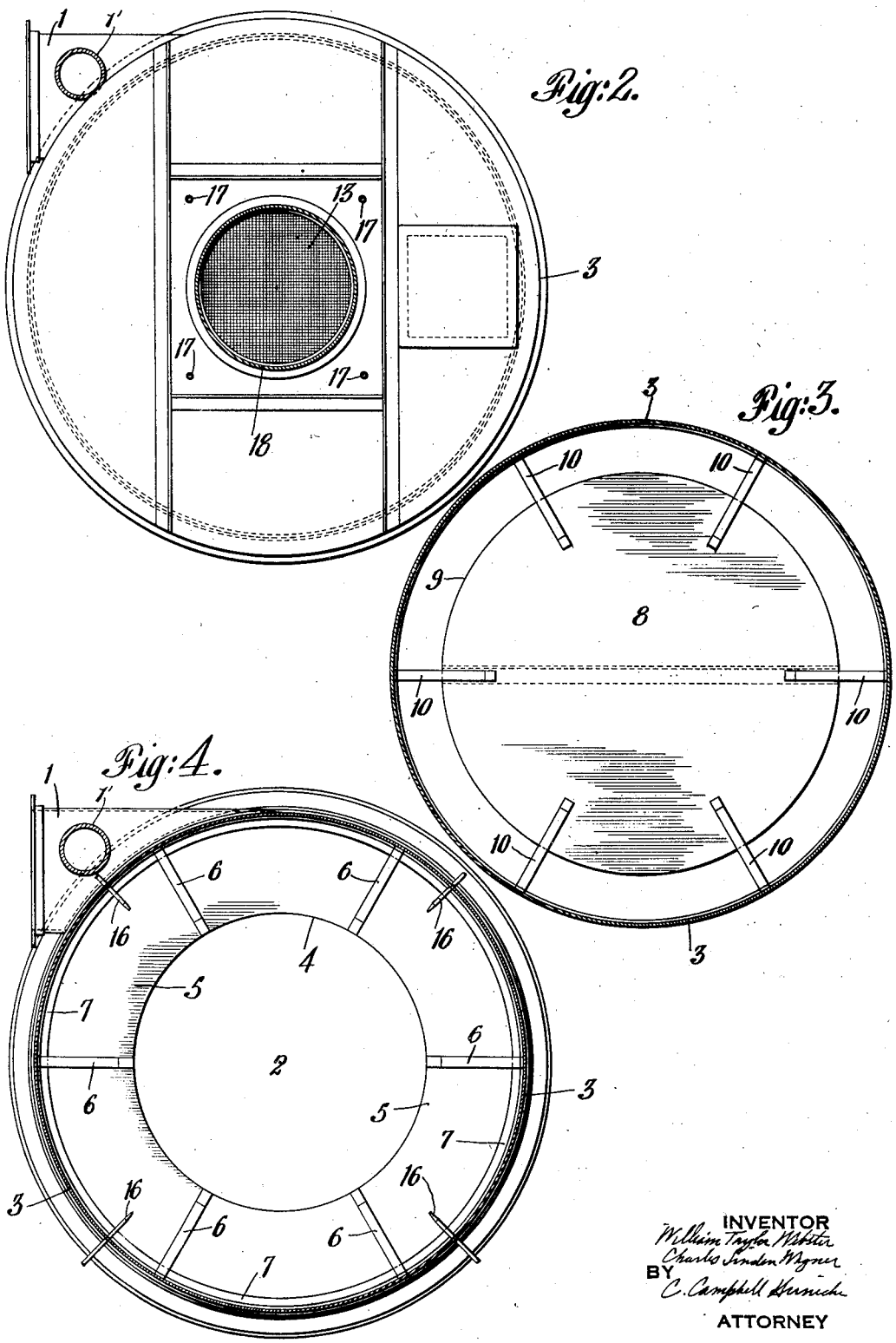

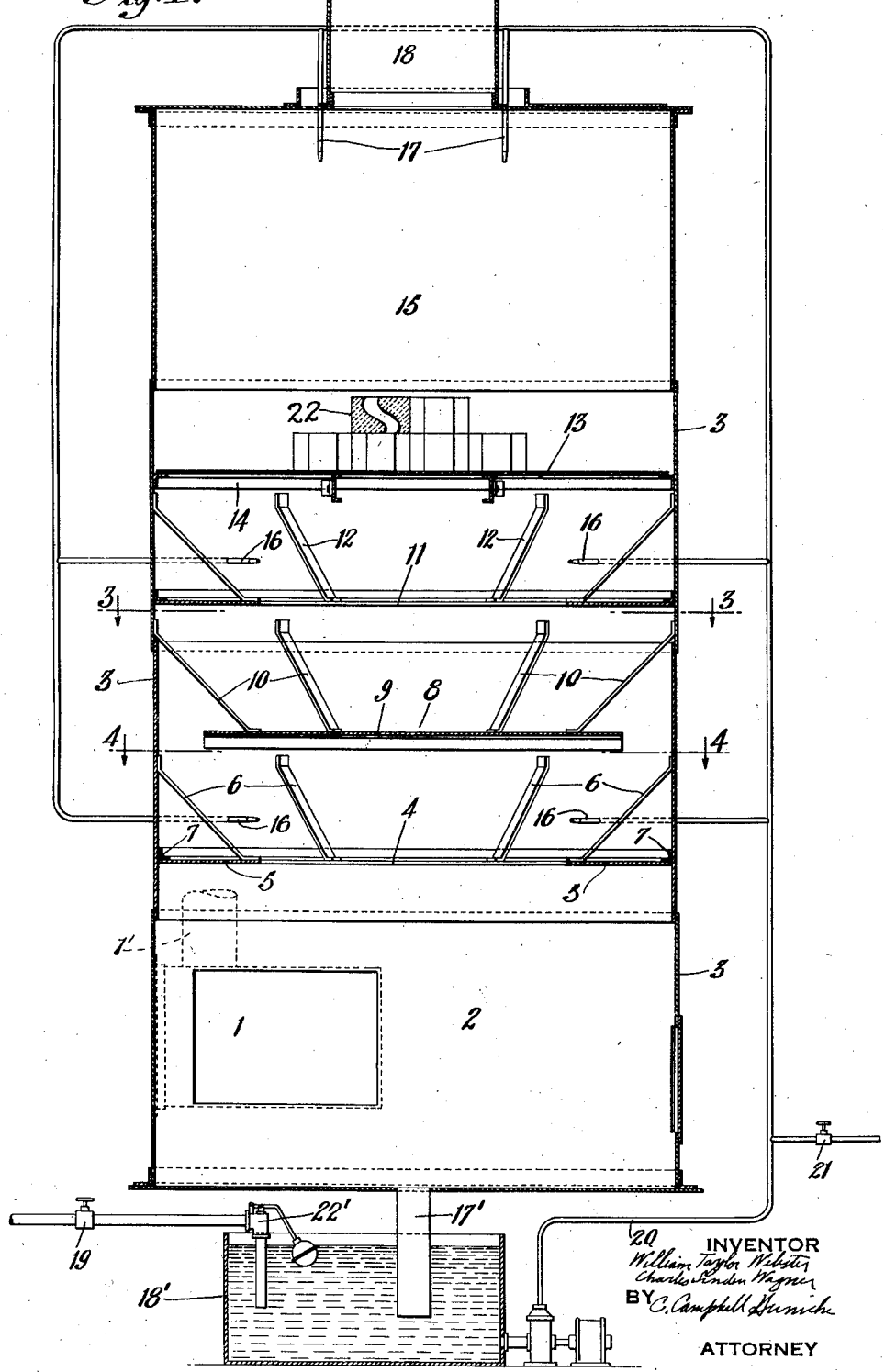

Patented Dec. 15, 1931

1,836,563

UNITED STATES PATENT OFFICE

WILLIAM TAYLOR WEBSTER, OF PELHAM, NEW YORK, AND CHARLES LINDEN WAGNER, OF BOONTON, NEW JERSEY

METHOD FOR FOAM ABATEMENT AND CHEMICAL RECOVERY

Application filed March 25, 1930. Serial No. 438,666.

This invention relates to a method and apparatus for abating foam and recovering chemicals contained in the foam In many industrial processes such as in the manufacture of kraft or sulphate pulp and variations thereof when a resinous wood is used foaming occurs, or if the wood contains other substances which also cause excessive foaming due to chemical interaction, the customary methods of handling and treating the chemical products such as washing and evaporation cannot be used due to the immense volumes of foam formed with the consequent loss of chemicals in the foam. The foam is formed as an incident of the heating, vacuum and agitation of the sodium resinate contained in the material in the process of manufacture, which sodium resinate, because of the evolution of non-condensing gases, the colloidal nature and surface tension, forms a very persistent foam of great volume. Such foam will even dry as a foam in the air. Where certain woods are used the liquor even foams when in storage tanks necessitating venting and consequent loss of chemicals in the vented foam.

Among the objects of our invention is to provide a method and apparatus for abating the foam formed in certain industrial processes in the manufacture of paper pulp and the recovery of the chemicals contained in the foam.

Referring to the drawings:

Figure 1 is a vertical sectional view of a device embodying the principles of our invention.

Figure 2 is a top plan view of Figure 1.

Figure 3 is a sectional view of Figure 1 along the line 3, 3, looking in the direction of the arrows.

Figure 4 is a sectional view along the line 4, 4, looking in the direction of the arrows.

In carrying out our invention we propose to conduct the foam from the place of formation in pipes to the point of inlet 1' on the apparatus which pipe leads into an inlet chamber 1. In chamber 1 the foam is mixed with hot gases preferably furnace gases, likewise admitted into chamber 2 tangentially of the apparatus. These furnace gases are high in carbon dioxide. The sodium resinate is a combination of caustic soda and resin which latter has a weak chemical bond and splits up into sodium carbonate and resin acids, these products have low viscosities and different tensions. Under the action of carbon dioxide and the heat the resin acids and organic matter are thrown out of solution, the organic matter becoming charred. The heated gases rise within the circular container having metal walls 3 and the gas and air contained in the bubbles expands greatly by reason of the heat contained in the hot gases. As the gas and air contained in the bubbles expand the bubble wall becomes thinner. The surface tension changes also and the bubble finally becomes ruptured. The gaseous content of the bubble mixed with the furnace gases carries upward the mist in very finely divided particles with the chemicals contained therein in suspension. Within walls 3, we provide a series of baffles. The lower baffle 4 is a circular ring 5 supported by bracing 6 and angular ring 7. Above baffle 4 is baffle 8 comprising a circular plate 9 supported by braces 10. Plate 9 overlaps the central opening in baffle 4. The latter does not completely fill the space between the walls 3 of the device. A similar baffle ring 11 to ring 4 with corresponding braces 12 is above baffle 8. Above the baffles and within walls 3 of the device is a grating 13 supported by angular ring 14 preferably welded to the shell or walls 3. Above grating 13 is a chamber 15. Upon grating 13 and within chamber 15, we propose to provide one or more layers of (hexahelix) tile 22. Positioned amongst the baffles are sprays 16 spraying in a horizontal direction. The gas-water-suspension passing up through the apparatus is broken and the chemicals removed by the surface contact with the walls and baffles and by the sprays 16. There is also a breaking up of the gas-water-suspension by surface contact and sprays 17 in passing through the tile into chamber 15. The gas entering tangentially at high velocity and acquiring a spiral direction with upward mass movement encounters the sprayed water which is directed countercurrently. Water when sprayed has a positive electric charge. The negative electric charge of the dust cloud in the furnace gases is neutralized by the positive charge of the sprayed water permitting the wetting and solution of the chemicals which partly separate and are partly suspended as a mist or gas water suspension. The further separation and removal is caused by the direction changes and surface contact with the baffles, walls and tiles. The circulating solution becomes concentrated and is returned to other uses either continuously or intermittently in batches through outlet 17' while the waste gases pass out through stack 18. The sprays 16, 17, reutilize the liquor from supply tank 18' until the liquor reaches a predetermined concentration. Valve 19 is closed and the concentrated liquor is pumped out through pipe 20. Valce 19 is then opened and valve 21 is closed and the tank automatically fills with water or weak liquor until float valve 22 shuts off the supply. The process is then continued. In the device from fifteen to twenty-five gallons of water per minute is evaporated out of the liquor by the hot gases. The volume in the tank is maintained a constant by float valve 22'. As the quantity of spray material is a constant and as the chemicals are continually dissolving in the spray liquor the chemical concentration increases until it reaches the desired strength when the concentrated liquor is removed as previously indicated and replaced by water or weak liquor.

It will thus be seen that we have provided an apparatus for the abatement of foam and the recovery of the chemical products therefrom as well as the simultaneous recovery of the chemical dusts contained in furnace gases. Although we propose to use waste furnace gases the foam abatement may be accomplished without the use of these gases and by the use of others. It should be noted that although we have shown a form of baffling which has proved satisfactory, yet modifications thereof might be made and still fall within the principles of our invention. It should also be noted that the abatement of the foam is accomplished by the introduction thereof into a stream of highly heated gases moving at high velocity both introduced into a substantially vertical circular container tangentially and having an upward mass movement through a series of baffles wherein the mixture is sprayed countercurrently and finally passing through the tiles which have large contact surfaces and change of direction. The sprays from above serve to separate any remaining gas-water-suspension containing chemicals and to keep the surfaces of the tiles clean.

What we claim is:

1. The method for abating foam produced from liquors and recovering the chemicals contained in the foam comprising introducing tangentially into a circular container the foam into a stream of highly heated gases at high velocity, to cause the mixture to travel in a direction generally spirally and upwardly with specific changes of direction also induced in the travel of the mixture, spraying the mixture with liquid falling countercurrently to direction of travel of the mixture and separately delivering the gaseous and liquid products.

2. The method for abating foam from industrial liquors and recovering the chemicals contained in the foam, comprising mixing the foam with highly heated gases and imparting to the mixture a rising general spiral motion at high velocity while exposing the mixture to surfaces and causing specific changes of direction in its general travel and subjecting the mixture to sprays falling downwardly against the current of rising foam and gases and finally passing the mixture through tortuous passages having relatively large surfaces and washing simultaneously the passages and surfaces by sprays and separately delivering the gaseous and liquid products.

Signed at New York, in the county of New York and State of New York this 21st day of March, A. D. 1930.

WILLIAM TAYLOR WEBSTER.
CHARLES LINDEN WAGNER.